C. P. PENTONEY.
HEADLIGHT FLAG SUPPORTING DEVICE.
APPLICATION FILED JUNE 4, 1917.
1,241,433.
Patented Sept. 25, 1917.
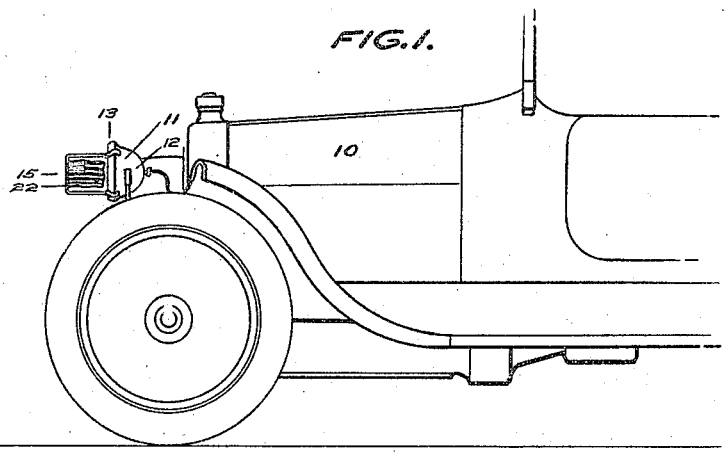
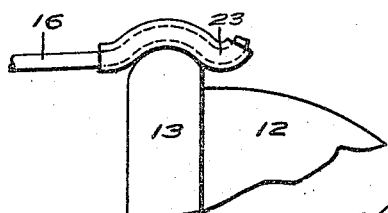
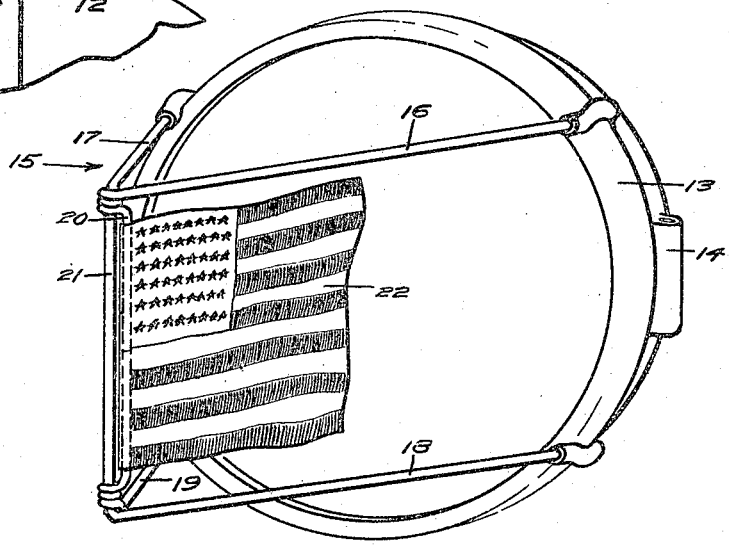
INVENTOR
CLIFFORD P. PENTONEY
BY Hazard and Miller
ATTYS

UNITED STATES PATENT OFFICE.

CLIFFORD P. PENTONEY, OF PASADENA, CALIFORNIA.

HEADLIGHT FLAG-SUPPORTING DEVICE.

1,241,433.   Specification of Letters Patent.   Patented Sept. 25, 1917.

Application filed June 4, 1917. Serial No. 172,650.

*To all whom it may concern:*

Be it known that I, CLIFFORD P. PENTONEY, a citizen of the United States, residing at Pasadena, in the county of Los Angeles and State of California, have invented new and useful Improvements in Headlight Flag-Supporting Devices, of which the following is a specification.

This invention relates to a flag holder and particularly pertains to means for mounting a flag upon the headlights of automobiles and the like.

It is the principal object of this invention to provide a simple expedient for securing a flag upon the headlight of an automobile in a manner to cause it to be illuminated by the light rays emanating from the headlight.

Another object of this invention is to provide a flag mounting of the above class which is decidedly simple in its construction and may be easily mounted upon a headlight without the necessity of alteration of existing parts or possibility of disfiguring the lamp in any way.

It is a further object of this invention to provide a flag mounting which may be inexpensively manufactured and which will support a flag so that it may be freely blown by the wind and will appear in the light of the lamp unfurled.

Other objects will appear hereinafter.

The invention is illustrated, by way of example, in the accompanying drawings in which:

Figure 1 is a fragmentary view in side elevation illustrating the forward end of an automobile and particularly showing a flag mounted before one of the headlights thereof.

Fig. 2 is an enlarged view in perspective illustrating the automobile headlight and clearly disclosing the details of construction of the flag and its mounting, as well as the manner in which the mounting is detachably secured upon the headlight.

Fig. 3 is an enlarged fragmentary view of one of the gripping jaws by which the flag mounting is secured upon the headlight.

Referring more particularly to the drawings, 10 indicates the body of an automobile upon which a headlight 11 is mounted. It will be understood that this headlight, or a plurality of such headlights, may be disposed at any desired location or locations upon the vehicle. As here shown it is mounted in a customary position directly forward of the radiator and at the side thereof. This headlight is formed with a body portion 12 and an annular lens rim 13. The lens rim is mounted upon a hinge 14 which secures it to the body of the lamp. This rim is preferably formed with a round outer face, as particularly disclosed in Fig. 3. It will be understood, however, that the present device may be readily adapted for use upon headlights of various design. Mounted upon the rim is a flag support 15, here shown as formed with pairs of angularly disposed clamping arms 16 and 17, and 18 and 19. The arms 16 and 18 are formed integral and are connected by an upright 20. The arms 17 and 19 are formed integral and are connected by an upright 21. These two uprights and the arms are connected so that the uprights 20 and 21 will extend vertically and will cause the pairs of arms 16 and 18 and 17 and 19 to converge at a point in front of the lamp. The uprights 20 and 21 are spaced a slight distance from each other in order to receive the edge of a fabric flag 22 which is there mounted and is free to wave in the rays of the light. The ends of the arms are formed with slight bends which permit them to conform to the arcuate outer face of the lens rim 13, as particularly shown in Fig. 3 of the drawings. These bent ends are covered with rubber tubing 23 which will protect the rim and at the same time hold the flag support in rigid relation thereto.

In operation, the fabric of the flag 22 is placed through the space formed by the upright portions 20 and 21 of the support and thereafter stitched around one or both of the uprights. The arms of the support may then be bent so that their outer ends will conform to the contour of the lamp rim 13. The arms are then sprung into position and the holder will be supported, as shown in Fig. 2. It should be noted that my device does not interfere with the light thrown out by the headlight, there being only the thickness of a wire vertically in front thereof, and the flag in the same vertical plane as the wire in front, and axial with the reflector of the headlight.

It will thus be seen that the device here shown is simple in construction, may be inexpensively manufactured, and detachably mounted to support a flag in front of the headlight of an automobile in a convenient manner.

While I have shown the preferred form of my flag support as now known to me, it is evident that various changes in the combination, construction, and arrangement of parts may be made by those skilled in the art without departing from the spirit of my invention.

I claim:

1. A flag support comprising a vertically disposed flag supporting staff, arms extending from said staff, and means whereby said arms may engage a headlight in a manner to support the staff vertically and a distance in front of the headlight.

2. A flag support comprising a pair of vertical supporting members between which the fabric of a flag may be placed and around one of which the flag may be secured, semi-rigid supporting arms extending from the top and bottom of said supporting members, the arms being formed with bent end portions adapted to conform to the sectional contour of the rim of a headlight, and rubber coverings positioned over said bent end portions whereby the arms may engage the lamp rim and will support the flag supporting members therebefore.

In testimony whereof I have signed my name to this specification.

CLIFFORD P. PENTONEY.

Copies of this patent may be obtained for five cents each, by addressing the "Commissioner of Patents, Washington, D. C."